2,831,771
MILK POWDER PROCESS AND PRODUCT

George W. McDonald, Forreston, and Bernard Weinstein, Ashton, Ill., assignors, by mesne assignments, to Crest Foods Co., Inc., Ashton, Ill., a corporation of Illinois No Drawing. Application March 14, 1955
Serial No. 494,240

11 Claims. (Cl. 99—55)

Powdered milk products have now been known for many years, but the desire to improve them remains. One of the most commonly recognized faults of milk powders is their limited absorption of water.

According to the present invention, a powdered skim milk is provided (from which the lactose may have been removed, if preferred) which can have a higher or chosen degree of absorption of water. A process for producing it according to the present invention is quite economical.

The process of the present invention may be deemed to start with condensed skim milk (skim milk from which some water has been removed) produced in any known or suitable manner and from which lactose may have been removed or not, as desired, again in any known or suitable manner. The conventional condensing methods all maintain the milk well below the temperature of 176° F.; as stated below, this is desirable for best taste characteristics.

Between this point and the ultimate spray drying, the milk is treated by two main steps:

(1) Precipitation of proteins, especially casein. It may be assumed that lactalbumin is also precipitated. Preferably only a part of the casein is precipitated, because that will usually result in the desired degree of affinity for water in the ultimate product, with a minimum material cost, and minimum danger of affecting taste or raising the ash content needlessly.

(2) Rendering the proteins of milk rehydratable, in situ.

(3) Drying in a manner to eliminate free alkali.

Casein precipitation

The casein can be precipitated by known methods, including alcohol precipitation, the salt-out method, and acid precipitation. The latter is preferred. To this end, the milk is heated to at least 115° F. and acid is added until the desired percentage of casein precipitates. Usually this will take a pH at least as low as 6.3. Greater heat and acidity can be used, depending largely on the percentage of casein precipitation which is desired in order to provide the selected degree of water affinity in the product. To provide the results at present contemplated to be most desirable, a temperature range of 140° to 160° F. and an acidity range of from 5.3 to 5.8 pH are suitable. Temperatures over 175° F. would probably be wasteful and endanger taste and adding acid to a pH value below 5.0 would be likely to precipitate all of the casein, the iso-electric point being approximately 4.7.

Any acid may be used, but for economy, minimum ash content and suitability of the ultimate product for food, a food grade hydrochloric acid is preferred.

If less than complete precipitation of the casein is desired, as is usually the case, the acid (if added to the entire batch) should be added without quick dissipation throughout the stock. In short, it should be added rather quickly with not more than mild agitation, so that where it is present, it will carry the pH low enough to reach the iso-electric point for the precipitation of the casein.

Alternatively, part of the batch can be withheld until casein has been precipitated from the first part. In this case rapid mixing is permissible, just enough acid being used to lower the pH of the first part low enough to precipitate all or substantially all of the casein of that part. The proportioning between the first part and the part withheld determines the degree of affinity for water in the final product, after the withheld batch is promptly added and the process finished as below. To provide the results at present contemplated to be most nearly comparable to the undivided batch method, a temperature range of 140 to 160° F. and an acidity range of from 4.7 to 5.1 pH are suitable. Rapid mixing is here preferred.

The undivided batch method first described is at present preferred because it has been found to yield a product of exceptionally natural flavor.

Resolubilization in situ

The precipitated proteins, casein and the lactalbumin are not now removed from the liquid but are promptly treated in situ for hydrating the proteins so that after again being dried, as stated below, they will have an exceptionally high absorptivity for water. To this end, a volatile alkali, such as ammonium hydroxide, should be added to provide a pH of at least 7.0, carried or maintained to the point of maximum hydration of the casein. Carrying the pH higher provides quicker rehydration and the preferred range is 7.4 to 7.8, as this seems to represent a good balance between the desire for speed and the desire to use a minimum of the alkali.

Ammonium hydroxide is preferred partly for reasons of economy, but more importantly because it can be removed by vaporization during spray drying. In short, a volatile alkali is preferred for this latter reason. In short, a volatile alkali is preferred for this latter reason. Although ammonium hydroxide is a weak alkali, moderate quantities suffice because the proteins are more readily rehydrated at this state, in situ, than after standing longer or being separated and dried.

Drying

The product thus far produced may be dried in any suitable manner, preferably in a manner which results in a powder. Spray-drying is preferred, partly for reasons of cost and partly because it dependably dissipates any free ammonia or free ammonium hydroxide. In other words, any free ammonia evaporates so that no free ammonia is found in the resulting product or in a water solution thereof. When the most natural flavor is desired, it is preferred that the pre-warming for the spray drying be kept below 176° F. thus preventing the formation of sulphides.

Vacuum roll drying is another form of drying that reliably dissipates the free ammonium hydroxide.

We claim:

1. The method of treating milk proteins in situ in milk liquids which includes the steps of treating a condensed skim milk to precipitate casein therein while maintaining its temperature as low as 175° F., and adding ammonium hydroxide to the entire resulting mixture in a quantity to raise the pH to at least 7.4 to rehydrate the precipitated casein.

2. The method of claim 1 in which the resulting mixture is dried and the free ammonium hydroxide is vaporized by the drying step.

3. The method of claim 1 in which the resulting mixture is then spray-dried, with vaporization of the free ammonium hydroxide, to produce a dry powder comprising all of the solids present in the milk from which the proteins were precipitated.

4. The method of the preceding claim in which the proteins are mintained below the temperature of 176° F. until the moment of spray-drying.

5. The method of treating milk proteins in situ in milk liquids which includes the steps of treating a condensed skim milk to precipitate a part only of the casein therein while maintaining its temperature as low as 175° F., adding ammonium hydroxide to the entire resulting mixture to rehydrate the precipitated casein, and drying the resulting mixture with vaporization of the free ammonium hydroxide.

6. A powdered milk product comprising at least all of the solids in skim milk other than the lactose content therein, at least part of the casein therein being in the state resulting from alkali rehydration after precipitation.

7. A powdered milk product comprising at least all of the solids in skim milk other than the lactose content therein, at least part of the casein therein being in the state of maximum water-absorption power resulting from alkali treatment at a pH at least as high as 7.4 following casein precipitation.

8. The process of making highly water-absorptive milk powder which includes the steps of precipitating casein at a temperature not over 175 degrees F. from a condensed skim milk containing at least all of the parts of skim milk other than lactose and some water, imparting maximum water-absorptive property to the precipitated proteins, in situ by mixing ammonium hydroxide with the entire resultant mixture to a pH at least as high as 7.4, and spray-drying the product then resulting.

9. The process of making a highly water-absorptive milk powder from a milk containing at least all of the parts of skim milk other than lactose and some of the water, which comprises precipitating casein therein by adding thereto, while at 140° F. to 160° F. hydrochloric acid to a pH for the entire mixture of 5.3 to 5.8; thereafter imparting maximum water-absorptive properties to the precipitated casein, in situ by adding to the entire mixture ammonium hydroxide to a pH of 7.4 to 7.8; and thereafter spray-drying the resultant product, thereby dissipating the free ammonium hydroxide.

10. The process of making a highly water-absorptive milk powder from a milk containing at least all of the parts of skim milk other than lactose and some of the water, which comprises precipitating casein by adding thereto, while at at least 115° F., and not over 175° F., hydrochloric acid to a pH for the entire mixture of at least as low as 6.3; thereafter imparting maximum water-absorptive properties to the precipitated casein, in situ by adding to the entire mixture ammonium hydroxide to a pH of at least 7.4 and thereafter spray-drying the resultant product, thereby dissipating the free ammonium hydroxide.

11. The process of making a highly water-absorptive milk powder from a milk containing at least all of the parts of skim milk other than lactose and some of the water, which comprises precipitating proteins therein including casein by adding thereto, while at at least 115° F., hydrochloric acid to a pH for the entire mixture of at least as low as 6.3; thereafter imparting maximum water-absorptive properties to the precipitated casein, in situ by adding to the entire mixture ammonium hydroxide to a pH of at least 7.4 and thereafter spray-drying the resultant product, thereby dissipating the free ammonium hydroxide; said proteins being maintained below the temperature of 176° F. until the moment of spray-drying.

References Cited in the file of this patent

UNITED STATES PATENTS

| | | |
|---|---|---|
| 996,832 | Campbell | July 4, 1911 |
| 2,665,989 | Howard et al. | Jan. 12, 1954 |